(12) United States Patent
Cismas et al.

(10) Patent No.: US 12,373,989 B2
(45) Date of Patent: Jul. 29, 2025

(54) LOSSLESS COMPRESSION TECHNIQUES

(71) Applicant: Apple Inc., Cupertino, CA (US)

(72) Inventors: Sorin Constantin Cismas, Saratoga, CA (US); Ali Sazegari, Los Altos, CA (US); Christian Thomas Martelock, Bonn (DE); Guy Cote, Aptos, CA (US)

(73) Assignee: Apple Inc., Cupertino, CA (US)

( * ) Notice: Subject to any disclaimer, the term of this patent is extended or adjusted under 35 U.S.C. 154(b) by 703 days.

(21) Appl. No.: 17/588,114

(22) Filed: Jan. 28, 2022

(65) Prior Publication Data

US 2023/0078235 A1 Mar. 16, 2023

Related U.S. Application Data

(60) Provisional application No. 63/243,529, filed on Sep. 13, 2021.

(51) Int. Cl.
*G06V 20/00* (2022.01)
*G06T 7/11* (2017.01)
*G06T 9/00* (2006.01)
*G06V 10/22* (2022.01)

(52) U.S. Cl.
CPC .............. *G06T 9/00* (2013.01); *G06T 7/11* (2017.01); *G06T 2207/20021* (2013.01)

(58) Field of Classification Search
CPC ... G06T 9/00; G06T 7/11; G06T 2207/20021; H04N 19/91; H04N 19/593
See application file for complete search history.

(56) References Cited

U.S. PATENT DOCUMENTS

| | | | |
|---|---|---|---|
| 8,867,614 B2 | 10/2014 | Shiodera et al. | |
| 10,049,427 B1* | 8/2018 | Lachowsky | ............ H04N 19/91 |
| 10,069,511 B2* | 9/2018 | Dubey | ................ H03M 7/3059 |
| 10,284,852 B2 | 5/2019 | Possos et al. | |
| 2020/0380732 A1* | 12/2020 | Lindberg | ................ G06T 9/008 |
| 2022/0215595 A1* | 7/2022 | Schroers | ............. H04N 19/147 |
| 2023/0078235 A1* | 3/2023 | Cismas | ..................... G06T 9/00 |
| | | | 382/245 |
| 2023/0091602 A1* | 3/2023 | Li | ......................... H04N 19/124 |

* cited by examiner

*Primary Examiner* — Bobbak Safaipour

(57) ABSTRACT

Compression techniques are described. In an embodiment, a first plane of sensor data is accessed, the first plane of sensor data is divided into a plurality of slices, each sample is encoded in each slice from the plurality of slices, where encoding a sample include computing a median based prediction for the sample, computing an error for the sample comprising a difference between the sample and the computed median based prediction, determining a context for the sample, selecting a model for the sample by using the determined context, and encoding the computed error by using the selected model.

20 Claims, 11 Drawing Sheets

LOSSLESS COMPRESSION TECHNIQUES

RELATED APPLICATIONS

This application claims the benefit of priority of U.S. Provisional Application No. 63/243,529 filed Sep. 13, 2021 which is herein incorporated by reference.

FIELD

Embodiments described herein relate to lossless compression techniques.

BACKGROUND INFORMATION

Image compression technologies generally provide lossy compression, but there are important use cases in which lossless image and video compression is required. Lossless compression techniques typically involve asymmetric encoding algorithms with an encoder being multiple times slower than the decoder. As such, there is a need for near real-time lossless compression techniques.

SUMMARY

In an embodiment, a first plane of sensor data is accessed, the first plane of sensor data is divided into a plurality of slices, each sample is encoded in each slice from the plurality of slices, where encoding a sample include computing a median based prediction for the sample, computing an error for the sample comprising a difference between the sample and the computed median based prediction, determining a context for the sample, selecting a model for the sample by using the determined context, and encoding the computed error by using the selected model.

In another embodiment, a first plane of encoded sensor data may be accessed and the first plane of sensor data may be stored as a plurality of slices. Encoded values may be decoded in each slice from the plurality of slices. The decoding of an encoded value a sample may include determining a context for the encoded value, selecting a model for the encoded value by using the determined context, decoding the encoded value using the selected model to generate a decoded value, and reconstructing a sample using the decoded value.

DETAILED DESCRIPTION

Figure 1:
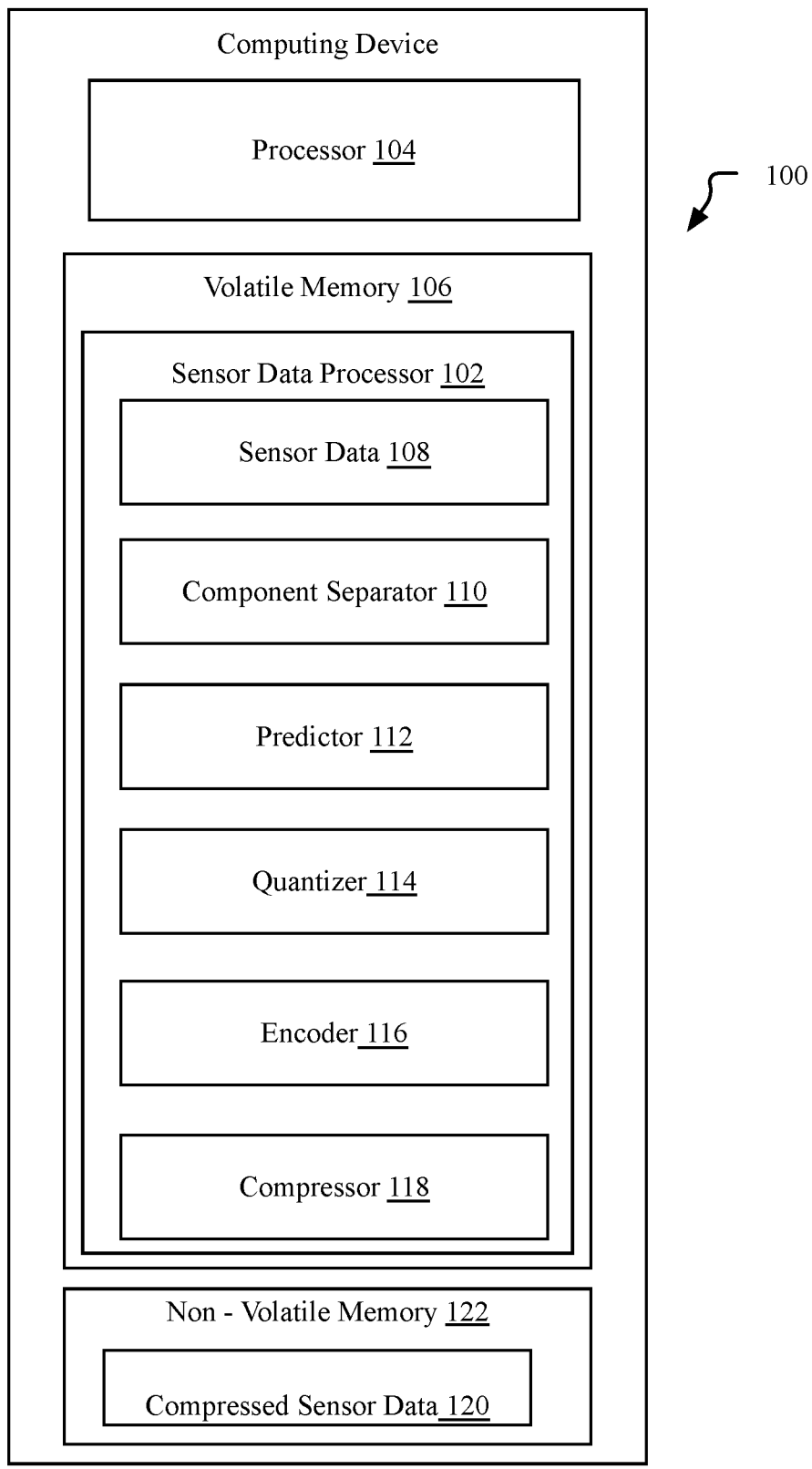
FIG. 1 illustrates an exemplary computing device that can be configured to perform compression techniques, according to an embodiment.

Embodiments describe compression techniques for lossless compression. Representative embodiments set forth techniques for encoding and compressing received sensor data. In particular, near real-time lossless compression is performed on received sensor data to provide improved compression ratios and higher throughput to reduce the load on system resources (e.g., providing lower power levels, conserving storage space, etc.). In some embodiments, nearly symmetric encoding and decoding algorithms may be performed to provide the desirable encoding speed, improved compression ratios, and reduced decoder complexity.

To process sensor data, in some embodiments, the sensor data may be separated into component planes, each plane is further divided into a plurality of slices, and samples are encoded from each slice. For example, sensor data may be divided into component planes for a particular color model (e.g., RGB sub-pixels, RGB intensity components, YUV, etc.). The color model is an abstract mathematical model describing the way color can be represented as tuples of numbers. Although examples are provided for division of data into component parts based on color models, those with skill in the art will recognize that data can be split into component parts in any number of ways to facilitate processing of the data in parallel.

Known previously processed sample data (e.g., above and to the left of the current sample in the process of encoded, etc.) may be used for processing a current sample during the encoding process. To encode the current sample, an error is computed for the current sample by determining a difference between the current sample and computed median based prediction for the sample. The error is encoded using output values from a model for the error E to represent the sample. To encode the error, a model is determined using a context (multi-dimensional) computed by quantizing a difference between previously processed known sample values.

Embodiments may utilize compression techniques described herein for acquisition of data for machine learning models, image or video mastering, synchronizing machine learning training data, and/or any other uses for near real-time, lossless capture of sensor data.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The methods disclosed herein can be performed by any suitable computing device and/or electronic circuit. FIG. 1 illustrates a block diagram of an exemplary computing device 100 that can be configured to perform compression techniques, according to an embodiment. As shown in FIG. 1, the computing device 100 may include processor 104, a volatile memory 106 and a non-volatile memory 122. Exemplary computing devices are also provided with FIG. 7 and FIG. 8, and some of the elements are omitted from FIG. 1 for ease of description. For example, computing device 100 may contain additional non-volatile memories (e.g., hard drives, etc.), other processors (e.g., graphics processing unit (GPU)), etc. Processor 104 may be a general-purpose central processing unit (CPU), an asymmetric multi-core processor, a symmetric multi-core processor, a graphics processing unit (GPU), and/or any other type of processor. The processor 104 may have an execution core (not shown) and may be configured to execute vector instructions (e.g., in a vector execution unit) as opposed to scalar operations.

In some embodiments, an operating system can be loaded into volatile memory 106, where the operating system (not shown) can execute the techniques described herein. For example, the operating system can include a sensor data processor 102 that uses a component separator 110 to separate received sensor data 108 into component parts for processing and one or more compressors 118 to compress the sensor data 108. Sensor data 108 may be image data, lidar data, video code, radar data, thermal data, infrared spectroscopy (IR) data, video data (e.g., processed frame by frame), or any other type of data. The component separator 110 may separate the sensor data into component part planes for processing. Examples of component parts include, but is not limited to, image pixel data split into sub-pixel red, green, blue (RGB) component parts, YUV component parts, RGB and Alpha channel, grayscale luminance, and pixel intensities, etc. By way of example, a video frame may be split into planes representing each RGB "sub-pixel" (or "channel") component parts and each plane may be processed as grayscale images.

Each component plane may be submitted for compression with the use of a predictor 112, quantizer 114, encoder 116, and compressor 118. The predictor 112 applies a predictive function to previously processed sensor data to predict the next sample of sensor data. In some embodiments, the predictor 112 is a median-based predictor that uses a function to compute a median to predict the sample data. The computed median is compared to the sample sensor data to compute an error value that is stored to encode the sample.

In an embodiment, the error value is encoded with the use of a model that is indexed by a context. The quantizer 114 may be used to compute a single quantum value for a given input that may be used as an index to lookup the model for a given sample or encoded error value for the sample. The quantizer 114 may compute a set of values that are used as a multi-dimensional context (e.g., three-dimensional context) that serves as an index to retrieve a model. For example, the multi-dimensional context for a current sample of sensor data being encoded or decoded may be composed of a set of quantized values for previously processed sensor data. The encoder 116 encodes or decodes the error using the model.

Run length encoding (RLE) may be performed on the encoded sensor data. In an embodiment, the RLE is performed on encoded error values stored as the encoded sensor data. RLE is a form of lossless compression which runs of data (i.e., sequences in which the same data value occurs in many consecutive data elements) are stored as a single data value and count for the number of occurrences of the single data value, rather than as the original data. The encoded data may be further compressed by compressor 118 using one or more compression techniques (e.g., LempelZiv-Welch (LZW)-based compressors, LZFSE (Lempel-Ziv Finite State Entropy), etc.).

Figure 2A:
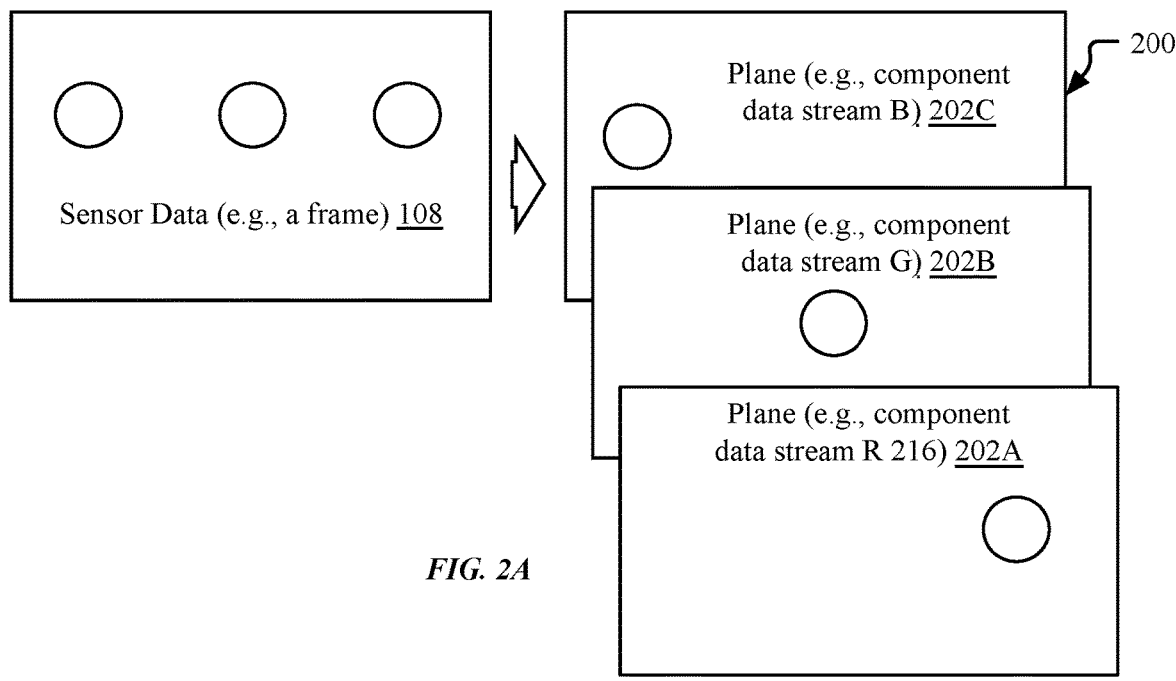
FIG. 2A is a block diagram illustrating a method of encoding sensor data, according to an embodiment.

FIG. 2A is a block diagram 200 illustrating a method of encoding sensor data, according to an embodiment. Sensor data 108 may be received by computing device 100. In some embodiments, the sensor data includes data that may be split into several components for processing. In some implementations, the component separator 110 separates the sensor data 108 into component parts (e.g., planes 202A-C). In some embodiments, the sensor data 108 includes data for a single component (e.g., plane 202A). In other embodiments, the sensor data does not have multiple components. In an example, the sensor data 108 can be frame of video data that is split into component parts based upon the color model (e.g., RGB).

Figure 2B:
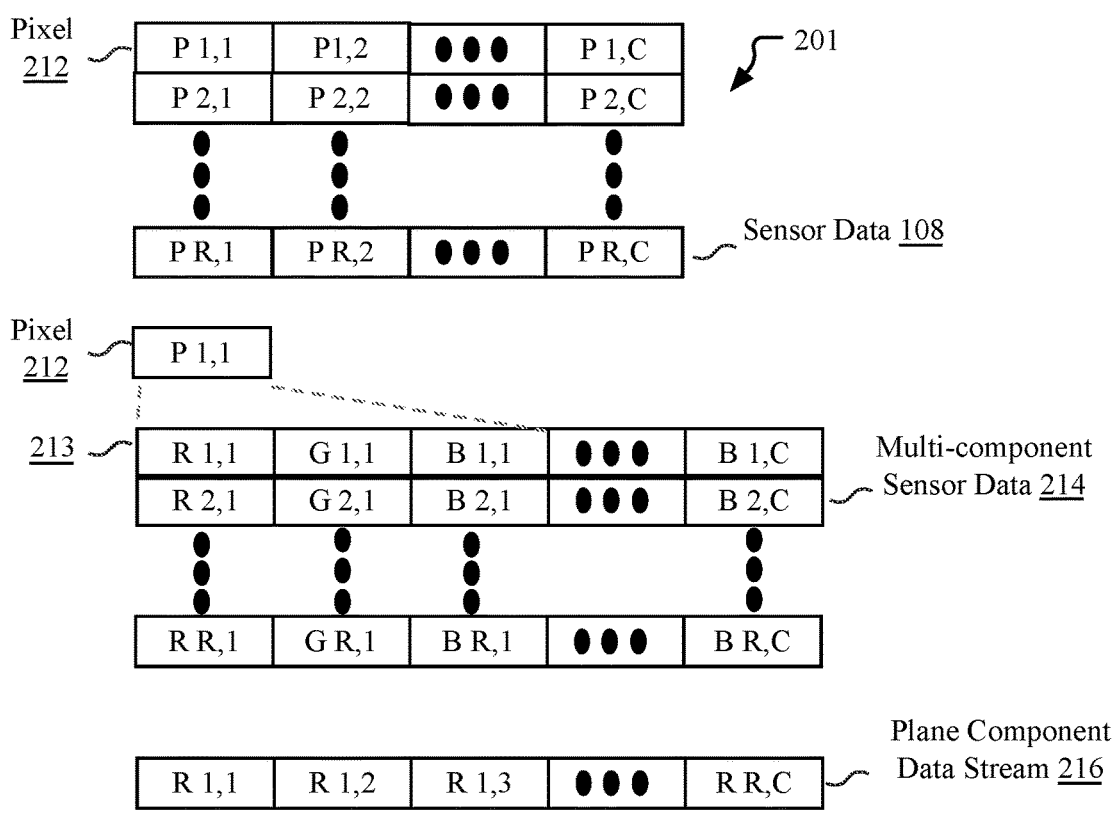
FIG. 2B is a block diagram illustrating a method of encoding sensor data, according to an embodiment.

FIG. 2B is a block diagram 201 illustrating a method of encoding sensor data, according to an embodiment. FIG. 2B illustrates an example of sensor data 108 that is image pixel data with rows and columns of pixels (e.g., from P1,1 to P R (row), C (column)). A single pixel P1,1 212, as illustrated with a representation of the multi-components for the sensor data 214, may have a set of component parts (e.g., sub-pixels or channels, etc.) as shown at 213 red with R1,1, green with G1,1, and blue with B 1,1. The component data 216 from the multi-component sensor data 214 may be the data split into component parts for the component plane data 202A as shown in FIG. 2A. In an embodiment, each plane may then be encoded as an individual gray scale image.

Figure 2C:
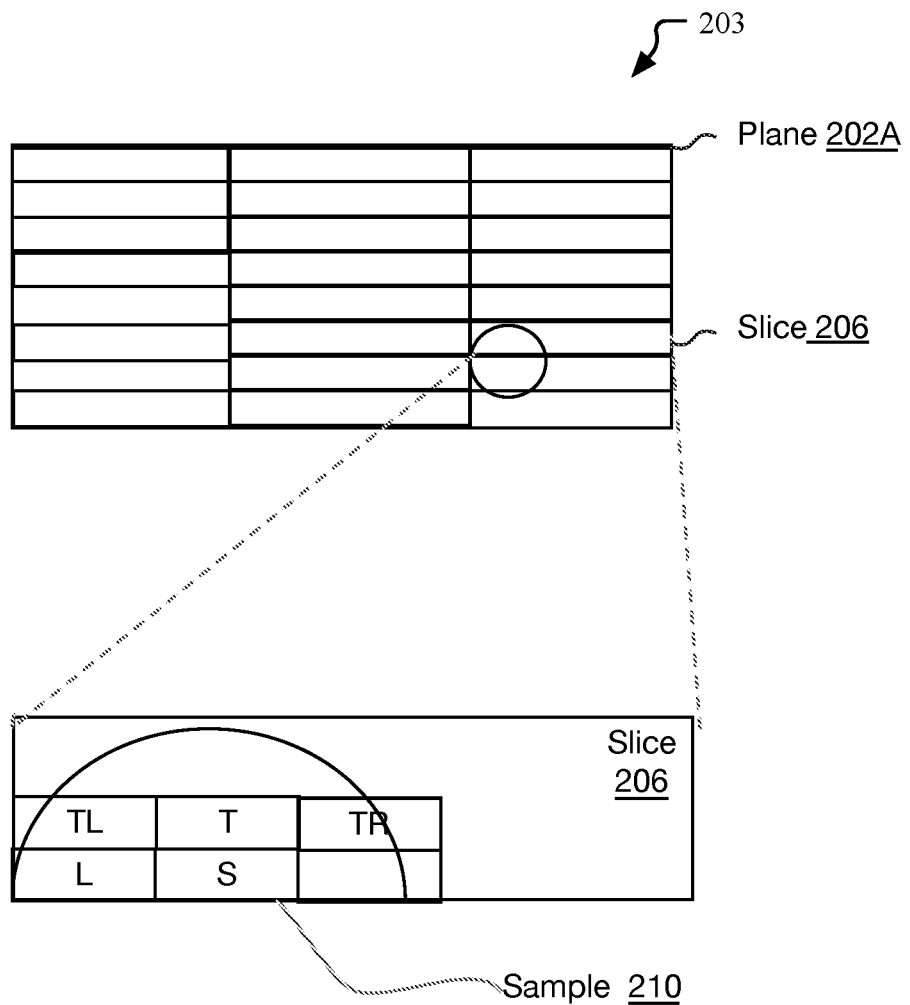
FIG. 2C is a block diagram illustrating a method of encoding sensor data, according to an embodiment.

FIG. 2C is a block diagram 203 illustrating a method of encoding sensor data, according to an embodiment. A plane 202A may be further divided into slices (e.g., as shown with 206) with vertical, horizontal, and/or vertical and horizontal slices (as shown) of the plane 202A. In some embodiments, slicing the data vertically is prioritized over horizontal slicing. As shown, plane 202A is sliced into 24 slices. In some embodiments, the slices may be processed in parallel by one or more processor 104 cores.

In an embodiment, each slice of plane 202A (e.g., slice 206) may be processed row by row from left to right with a predictive coding scheme using predictor 112. Previously processed data or known data for the plane (e.g., sample data from slice 206) may be used with a median based predictor 112 to provide a prediction for the sample 210. Although embodiments are described with a median based predictor, those with skill in the art will recognize that other types of predictor algorithms may be used. By way of example, previously processed sample data to the left (L), top left (TL), top (T), and top right (TR) may be used to provide a prediction P:

P=median (L, T, L+T−TL) 218 for the sample S 210.

The encoder 116 stores the prediction error E with E=S−P as shown with 220, where S is the sample and P is the prediction. In some embodiments, the use of the surrounding data for a sample to predict a value for the sample with P may decrease the errors in the predictions obtained. To encode the error E, a model from a plurality of models may be retrieved. The plurality of models is indexed with a multi-dimensional context C, and the retrieved model is used to look up a set of codes for encoding the error. The encoder 116 may use quantizer 114 to quantize previously processed data to form the multi-dimensional context used as an index to retrieve the model. In an embodiment, a three-dimensional context is used as the index to a model. By way of example, the context C with a three-dimensional context may be computed as follows:

C=(quantize (L−TL), quantize (T−TL), quantize (TR−T)).

The error E may be encoded and decoded using the model selected with context C. The encoder 116 may be capable of handling noisy image data and complex gradients with the median based predictor that exploits the two-dimensional properties of an image. For example, the learned textures or gradients for surrounding data may be used to form a prediction for a sample. The plurality of models can capture a plurality of complex gradients because each model is selected by using local context based on surrounding gradients from known previously processed sample data (as opposed to matching literals in other compression approaches) and each model will have values for encoding and decoding data with similar gradients.

Figure 2D:
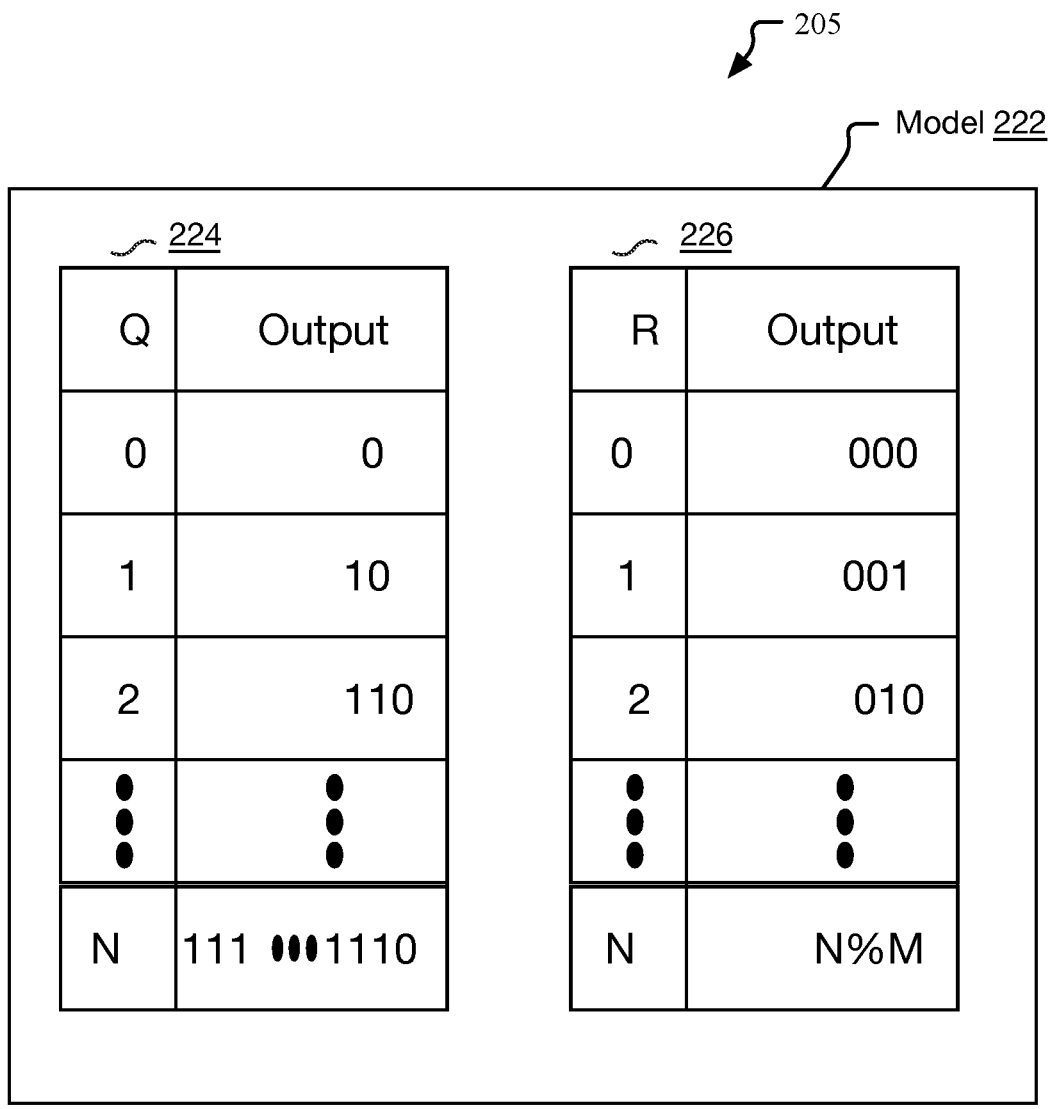
FIG. 2D is a block diagram illustrating a method of encoding/decoding sensor data, according to an embodiment.

FIG. 2D is a block diagram 205 illustrating a method of encoding/decoding sensor data with a model 222, according to an embodiment. Although one model is illustrated in FIG. 2D, those with skill in the art will recognize, there may be a plurality of models supporting various gradients, textures, and/or variations in sensor data. In some implementations, encoding sensor data includes encoding the prediction error computed for a sample S. In some embodiments, encoding the prediction error E includes encoding the prediction error using a G-R (Golomb-Rice) model (e.g., 222 shown in FIG. 2D) to perform the encoding. In some embodiments, encoding the error E using a G-R model 222 is used, as shown in FIG. 2D, includes dividing the error E by a predetermined number M and the value for the quotient Q and the remainder R resulting from the division may be used as an index to the G-R model as shown with table 226.

In some embodiments, the number used to divide the prediction error E is identified by a parameter M. In some variations, the parameter M is a configurable parameter. However, the number used to divide the prediction error E can be determined in any suitable manner. In some embodiments, the obtained quotient Q and remainder R are used to obtain the encoded value for the prediction error E from the selected model. In some embodiments, the G-R model (e.g., 222) contains one or more tables, and the quotient Q and remainder R values are used as indexes into the tables of model 222 to retrieve corresponding table values that are used to generate the encoded prediction error. In some embodiments, a quotient table value retrieved by using the quotient Q and a remainder table value R retrieved by using the remainder R are combined (e.g., concatenated) to generate the encoded prediction error. In some embodiments, the respective Q and R output values combined (e.g., concatenated) to encode error E within the bit stream for the slice. By way of example, the quotient Q=2 and the remainder R=1 may be combined to be 110001. The encoded error may have a fixed size such that a reduced number of bits from the values for Q and/or R are used to encode the error. By way of example, in a case where the quotient Q =2 and remainder R=1 for a prediction error E, the value quotient table value "110" is retrieved from the quotient table 224, and the remainder table value "001" is retrieved from the remainder table 226, and these two values are combined to be "110001". In some embodiments, the most significant bits are not encoded. The same tables 224 and 226 of the G-R model 222 may be used to lookup the quotient Q and remainder R to reconstruct the error E with the parameter M when decoding the encoded sensor data. In some embodiments, the most significant bits are not encoded. The same tables 224 and 226 of the G-R model 222 may be used to lookup the quotient Q and remainder R to reconstruct the error E with the parameter M when decoding the encoded sensor data.

Some combinations of Context C and Error E can trigger a run length encoding (RLE) that may increase processing speed and improve compression ratio. In some embodiments, RLE may be used when repeated samples are perfectly predicted (E=0), in some embodiments. The quantization of the context may be non-linear, so more contexts are used to distinguish between small gradients. The increase in number of contexts may likewise increase the probability for perfect prediction, thus increasing the duration of the RLE mode. RLE may use an exponential coding scheme with hysteresis, so only a few bits are needed for long runs, without increasing the bits for short runs. The RLE mode may enable compression ratios above 100 times for images with flat areas and/or repetitive patterns. For example, a black image can be compressed to as little as 10 bytes, no matter the size of the image, up to 64K×64K.

Figure 3:
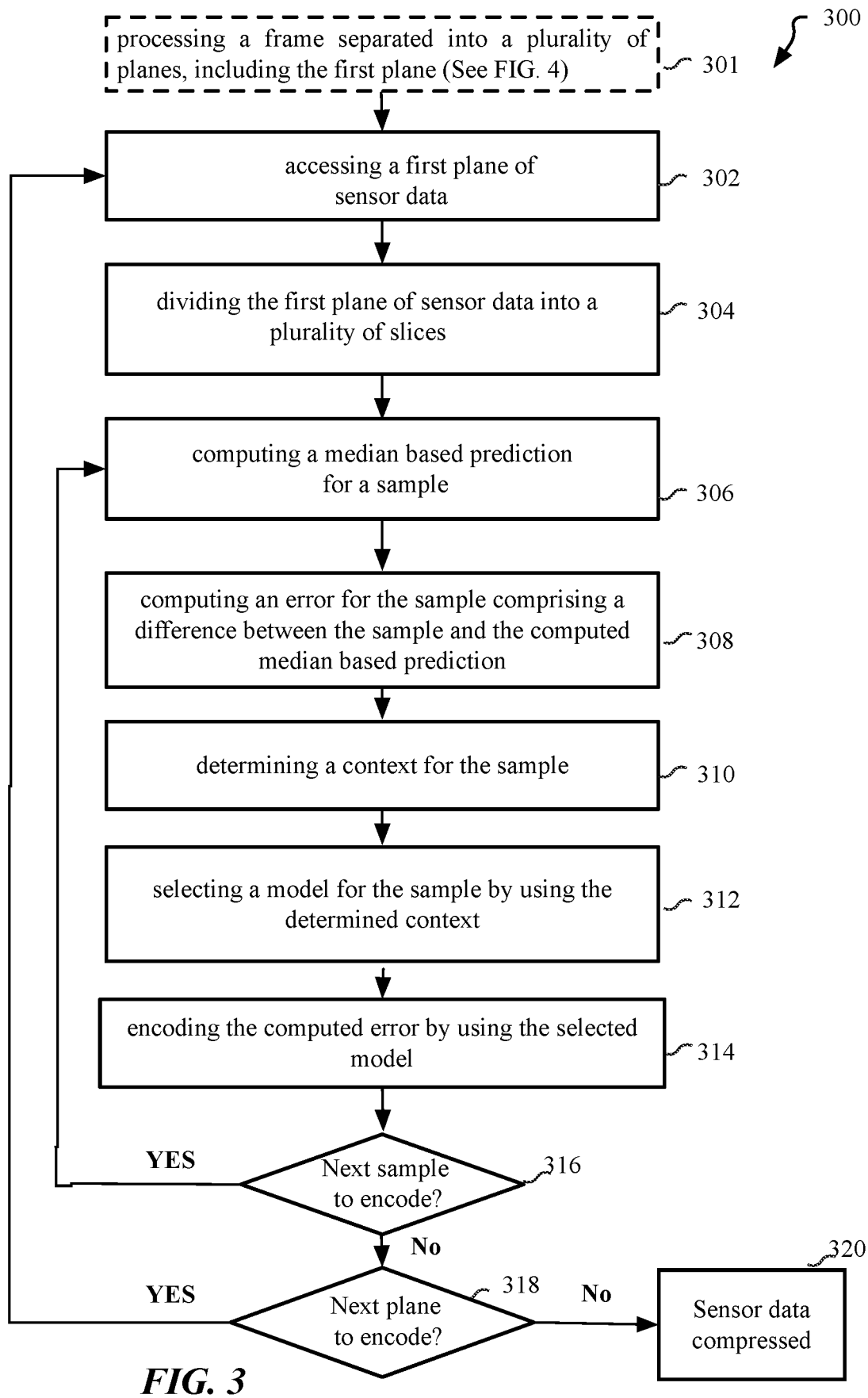
FIG. 3 is a flow diagram illustrating a method of encoding sensor data, according to an embodiment.

FIG. 3 is a flow diagram 300 illustrating a method of encoding sensor data, according to an embodiment. In some embodiments, received sensor data is divided into a plurality of sub-component planes (301) as shown with FIG. 4. In another embodiment, the sensor data has only one plane for processing, and thus step 301 is not performed. A first plane of sensor data may be accessed (302). The first plane of sensor data may be divided into a plurality of slices (304), each slice including at least one sample. In some embodiments, the first plane is divided vertically and horizontally into slices to allow for parallelization of processing each slice on a processing core of processor 204. By way of further example, if there are eight rows with each row having 3 slices, the eight cores of processor 204 may each process sensor data from a row. Each sample in each slice from the plurality of slices is encoded.

Encoding a sample may include computing a median based prediction for the sample (306). The median based prediction may be computed using previously processed sample data as described with FIG. 2C. An error may be computed for the sample that includes a difference between the sample and the computed median based prediction (308).

A context may be determined for the sample (310). The context may be computed with previously processed sample data as described with FIG. 2C. A model (e.g., Golomb-Rice (G-R) models as shown in FIG. 2D) is selected for the sample by using the determined context (312). The multi-dimensional context may be used as an index to select the model for encoding the error. The error is encoded by using the selected model (314). The selected model is accessed to determine the proper encoding for the error as describe with reference to FIG. 2D. In an embodiment, the input to the selected model is the error E that may be divided by the parameter M for the model and the appropriate encoding for the error value can be retrieved from the model using the quotient Q and remainder R resulting from the computation.

In some embodiments, the encoder 116 stores the encoded error and the decoder may use the stored error to reconstruct the sample S. If there is a next sample to encode (316), then process continues with processing the samples (306). Alternatively, a decision is made as to whether there is a next plane to encode (318). If there is another plane to encode, then the process continues (302) with the next plane. Alternatively, if there are no more planes to encode (318), then the sensor data for the plane may be compressed sensor data 120 (320). In an embodiment, the plane may be encoded as an individual grayscale image with 8 to 16 bits of information for each sample.

In some variations, encoding a plane of sensor data includes combining each encoded prediction error into an encoded plane. In some embodiments, the encoded prediction errors are stored in a two-dimensional data structure at positions corresponding to the positions of the associated samples in the original (unencoded) plane (e.g., as shown in FIG. 2C).

Figure 2E:
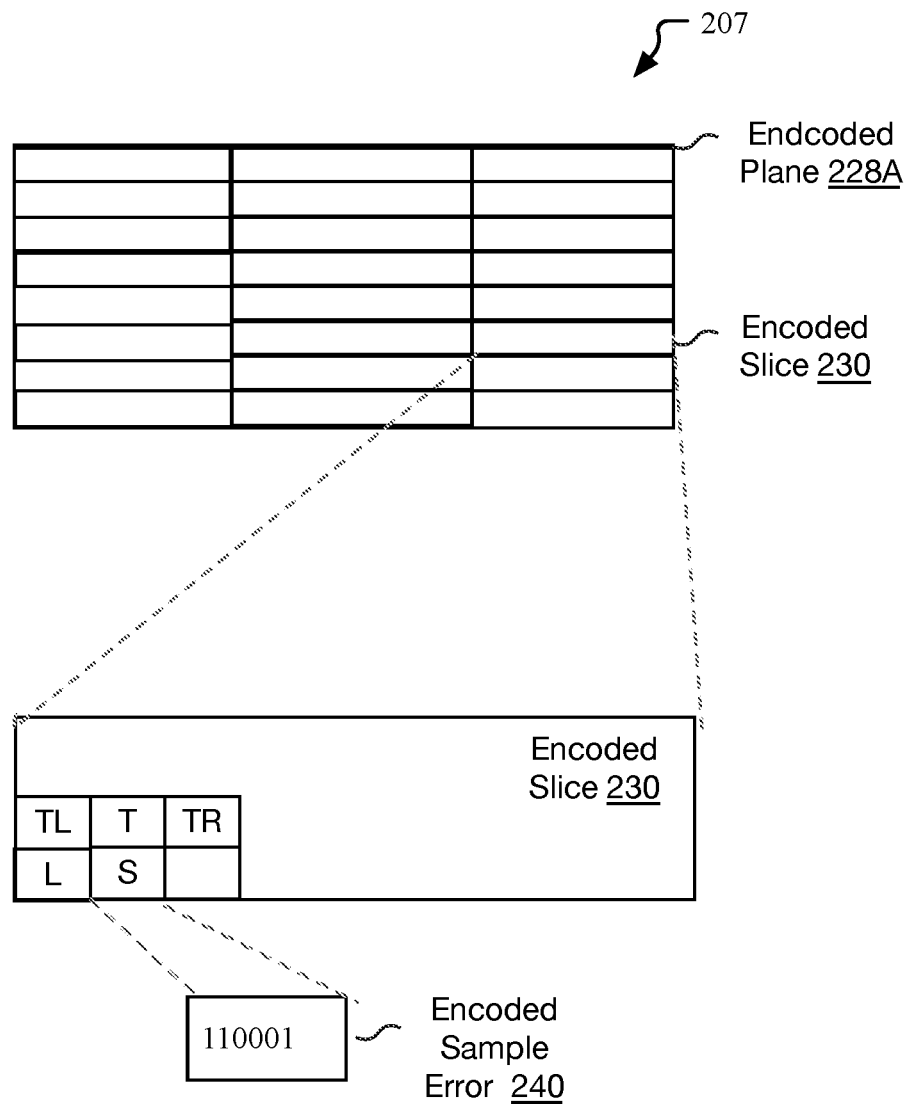
FIG. 2E is a block diagram illustrating a method of encoding/decoding sensor data, according to an embodiment.

FIG. 2E is a block diagram 207 illustrating a method of encoding/decoding sensor data, according to an embodiment. As shown in FIG. 2E, the encoded prediction error 240 is an encoded prediction error for sample 210 shown in FIG. 2C. In some implementations, at least one encoded plane 228A is stored in a storage device. The stored and encoded plane 228A can be processed asynchronously. For example, the encoded planes can be encoded planes for image data that can be retrieved at any suitable time for training a machine learning model and/or a neural network. By virtue of encoding the planes as described herein, storage space can be used more efficiently. In some implementations, at least one encoded plane 228A is transmitted via a network. By virtue of encoding the planes as described herein, network bandwidth can be used more efficiently. However, the encoded planes can be stored, transmitted, or processed in any suitable manner.

In an embodiment, the encoding is performed in two phases. In a first phase, the encoder 116 gathers statistics for G-R models and determines parameters M for the model before processing each plane (e.g., frame) or set of planes during the processing of the samples to encode the sensor data. Embodiments may also determine a model specific error bias before processing each frame. For example, contexts and error codes may be calculated for received sensor data to establish a G-R model for processing the sensor data. By way of further example, models may be encoded for each frame and used for decoding the same frame. The statistics for G-R models may then be gathered again for the next frame. In a second phase, the encoder 116 stores the model parameters in the bit stream.

In some embodiments, the encoder 116 may be capable of computing the sample predictions completely branchless and vectorized. In another example, the encoder 116 can determine model contexts with three table lookups and one branch.

Figure 4:
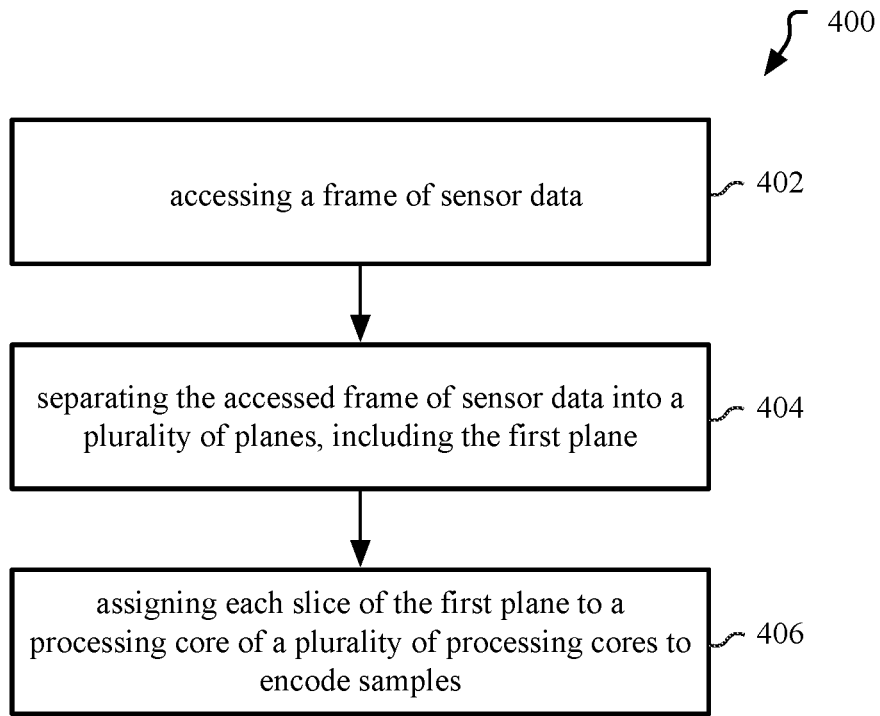
FIG. 4 is a flow diagram illustrating a method of encoding sensor data, according to an embodiment.

FIG. 4 is a flow diagram 400 illustrating a method of encoding sensor data, according to an embodiment. A frame of sensor data may be accessed (402). The frame of sensor data may include data for a plurality of components (e.g., sub-components, sub-pixels, channels). The accessed frame of sensor data is split into a plurality of planes including the first plane (404). The frame of sensor data may be split into planes for each sub-component of the frame (e.g., RGB pixel components) and each slice of the first plane may be assigned to a processing core of a plurality of processing cores (406). The plane may be sliced to allow for parallelization of encoding of each slice to available processing cores of the plurality of processing cores. In an embodiment, for each plane, a processing core assigned to the slice and the processing core encodes each of the samples of the slice. Although embodiments are described for parallelization of encoding of each slice of a plane, those with skill recognize that some embodiments allow for parallelization of processing for each plane and/or each slice of each plane from a plurality of planes.

Figure 5:
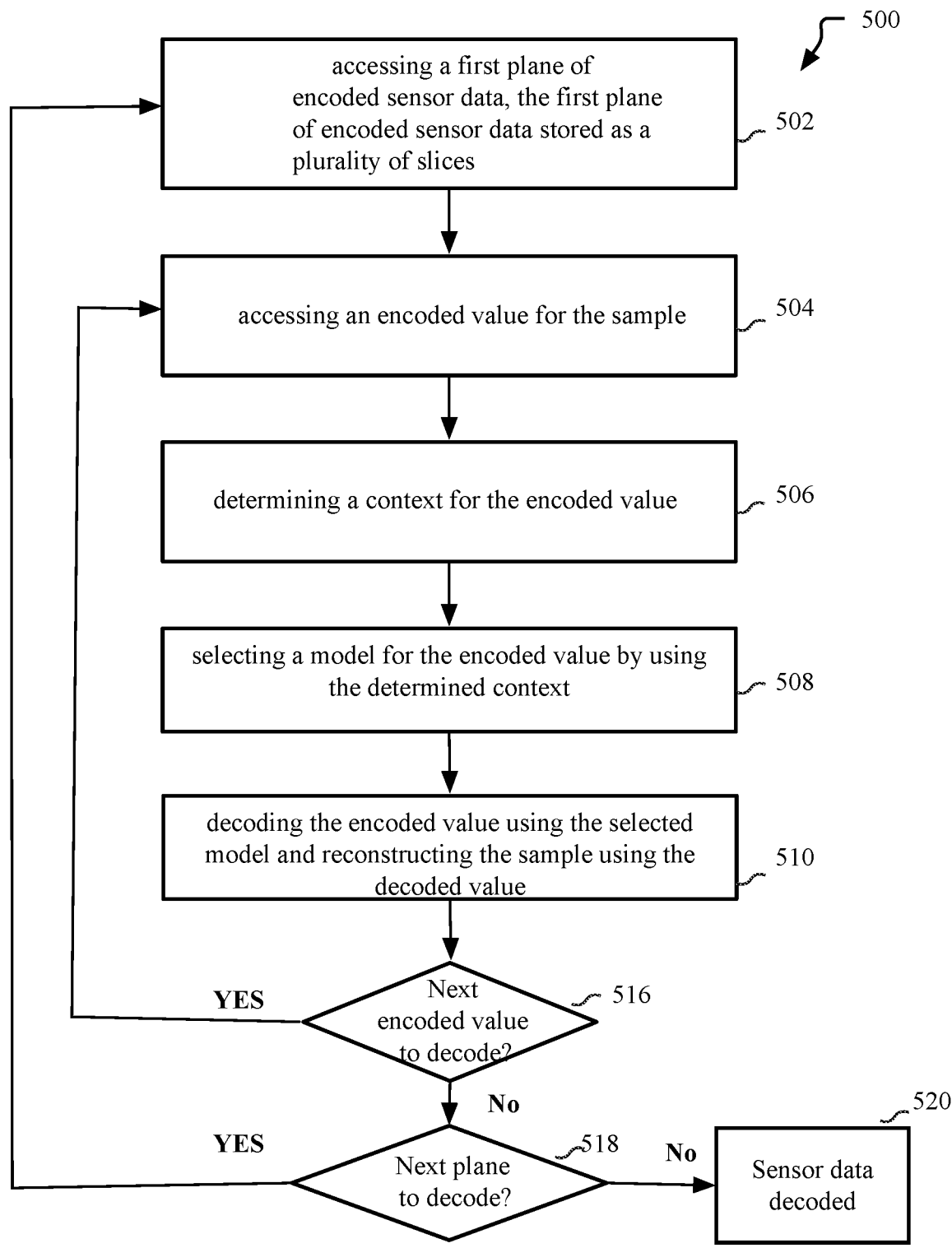
FIG. 5 is a flow diagram illustrating a method of encoding sensor data, according to an embodiment.

FIG. 5 is a flow diagram 500 illustrating a method of decoding sensor data, according to an embodiment. A first plane of encoded sensor data is accessed (502). The first plane of sensor data is divided into a plurality of slices in the encoding phase as described in FIG. 2A-D and FIG. 4. In some embodiments, each encoded slice is stored as shown in FIG. 2E to allow for decoding of each slice of the plane 228A in parallel. By way of further example, if there are eight rows of slices in plane 202A that are encoded as shown with encoded plane 228A with eight rows of encoded slices 230, then each row may be processed by a core in processor 104 (e.g., 8 cores). In another embodiment, each slice of a plane 202A and encoded plane 228 with 24 slices may be processed by a core in processor 104 (e.g., 24 cores).

Each encoded value is decoded in each slice from the plurality of slices. The encoded value 240 (e.g., the encoded sample error) for the sample is accessed (504) for processing. The encoded value 240 previously stored for a sample 210 of the slice 206 during the encoding phase is decoded. The encoded value 240 may be an encoded error for the sample 210. Decoding of the encoded value 240 (e.g., error) may include determining a context for the encoded value 240 for the sample 210 (506) from the first plane of encoded sensor data 228A. The context for the encoded value representing the sample is determined using the previously decoded data. For example, the context C=(quantize (L–TL), quantize (T–TL), quantize (TR–T)) using previously decoded data from encoded slice 230 may be used to retrieve the correct model to decode the encoded value 240 (e.g., encoded sample error code) as described above in regards to FIG. 2C. The reconstruction of the sample 210 using the context C uses three lookups with the three quantized values in this example.

The model 222 for the encoded values for the sample is retrieved by using the determined context (508). The G-R model and parameters are decoded before the decoding of the slices, and the corresponding error for the encoded value 240 may be retrieved. The sample 210 may be decoded using the selected model 222 and the encoded value 240 (510). The quotient Q output value from table 224 and the remainder R output value from table 226 for the decoded error are used to look up the quotient Q and the remainder R respectively from the selected model 222. The predictor 112 may compute a prediction and the sample may be reconstructed with the error E and the prediction P, where the sample S=P+E. The process may continue to process errors for samples (504), if there is a next encoded value to decode (516). The process may also continue (502), if there is a next plane to decode (518). Alternatively, the sensor data may be decoded 520.

Figure 6:
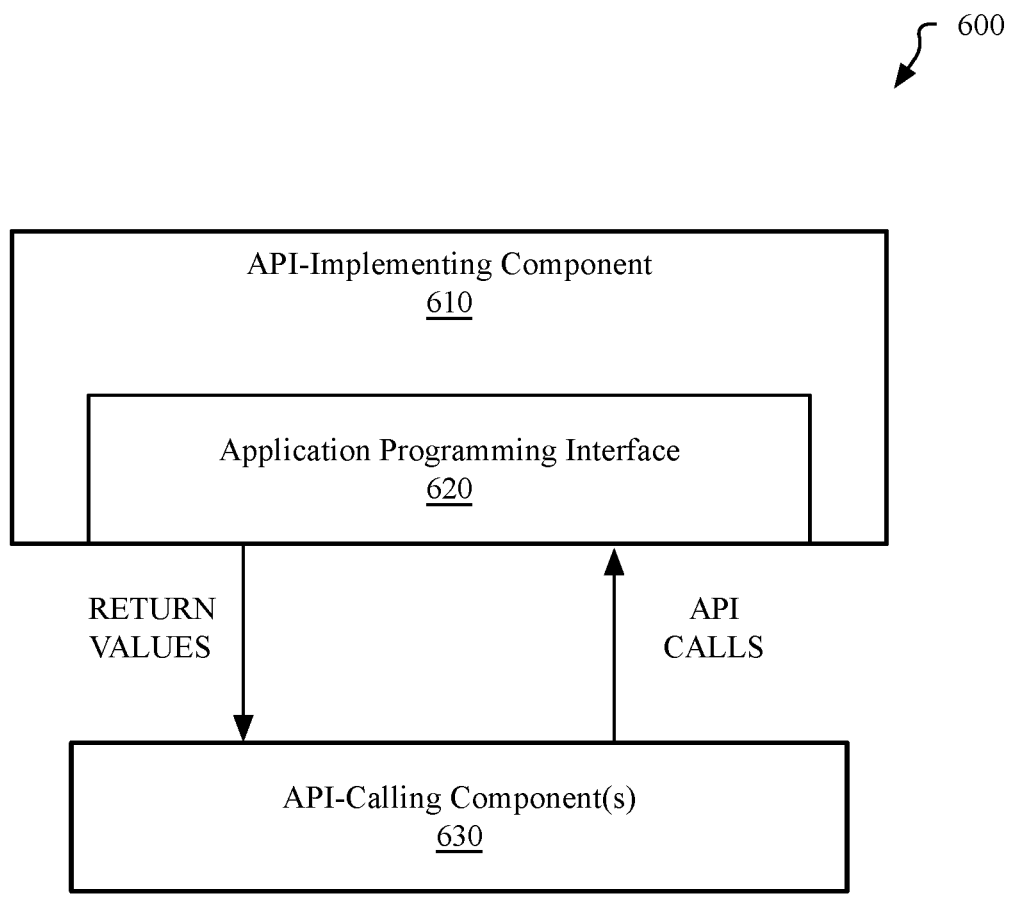
FIG. 6 is a block diagram illustrating an exemplary API architecture, which may be used in some embodiments.

FIG. 6 is a block diagram illustrating an exemplary API architecture, which may be used in some embodiments of the invention. As shown in FIG. 6, the API architecture 600 includes the API-implementing component 110 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 6 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 7:
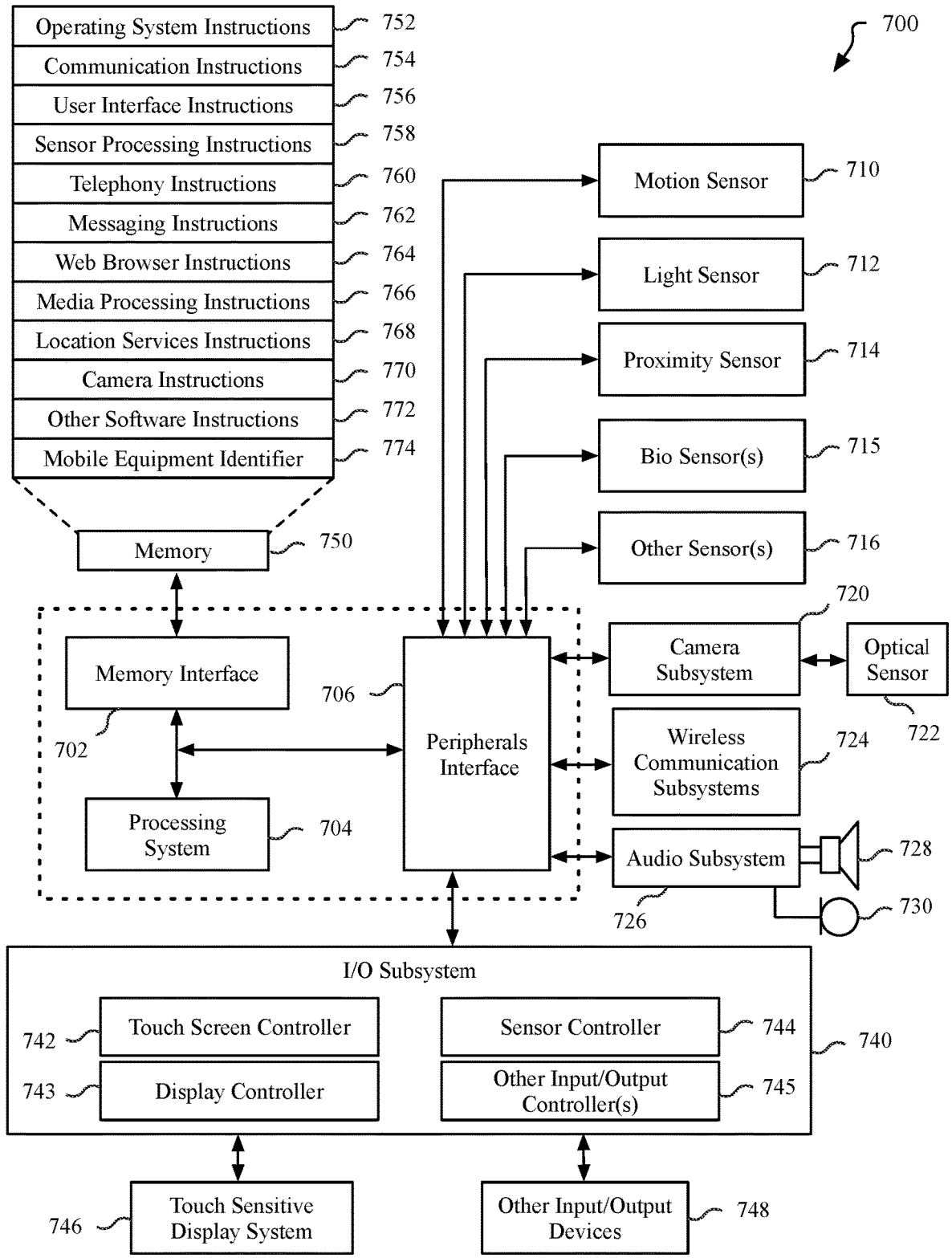
FIG. 7 is a block diagram of a device architecture for a mobile or embedded device, according to an embodiment.

FIG. 7 is a block diagram of a device architecture 700 for computing device, according to an embodiment. The device architecture 700 includes a memory interface 702, and a processing system 704 including one or more data processors. In some embodiments, the computing device includes image processors and/or graphics processing units, and a peripherals interface 706. The various components of the computing device can be coupled by one or more communication buses, signal lines, or network interfaces. The various components can be separate logical components or devices or can be integrated in one or more integrated circuits, such as in a system on a chip integrated circuit.

The memory interface 702 can be coupled to memory 750, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the mobile device functionality. One or more biometric sensor(s) 715 may also be present, such as a fingerprint scanner for fingerprint recognition or an image sensor for facial recognition. Other sensors 716 can also be connected to the peripherals interface 706, such as a positioning system (e.g., GPS receiver), a temperature sensor, or other sensing device, to facilitate related functionalities. A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the wireless communication subsystems 724 can depend on the communication network(s) over which a mobile device is intended to operate. For example, a mobile device including the illustrated device architecture 700 can include wireless communication subsystems 724 designed to operate over a GSM network, a CDMA network, an LTE network, a Wi-Fi network, a Bluetooth network, or any other wireless network. In particular, the wireless communication subsystems 724 can provide a communications mechanism over which a media playback application can retrieve resources from a remote media server or scheduled events from a remote calendar or event server.

An audio subsystem 726 can be coupled to a speaker 728 and a microphone 730 to facilitate voice-enabled functions, such as voice recognition, voice replication, digital recording, and telephony functions. In smart media devices described herein, the audio subsystem 726 can be a high-quality audio system including support for virtual surround sound.

The I/O subsystem 740 can include a touch screen controller 742 and/or other input controller(s) 745. For computing devices including a display device, the touch screen controller 742 can be coupled to a touch sensitive display system 746 (e.g., touch-screen). The touch sensitive display system 746 and touch screen controller 742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 746. Display output for the touch sensitive display system 746 can be generated by a display controller 743. In one embodiment, the display controller 743 can provide frame data to the touch sensitive display system 746 at a variable frame rate.

In one embodiment, a sensor controller 744 is included to monitor, control, and/or processes data received from one or more of the motion sensor 710, light sensor 712, proximity sensor 714, or other sensors 716. The sensor controller 744 can include logic to interpret sensor data to determine the occurrence of one of more motion events or activities by analysis of the sensor data from the sensors.

In one embodiment, the I/O subsystem 740 includes other input controller(s) 745 that can be coupled to other input/control devices 748, such as one or more buttons, rocker switches, thumb-wheel, infrared port, USB port, and/or a pointer device such as a stylus, or control devices such as an up/down button for volume control of the speaker 728 and/or the microphone 730.

In one embodiment, the memory 750 coupled to the memory interface 702 can store instructions for an operating system 752, including portable operating system interface (POSIX) compliant and non-compliant operating system or an embedded operating system. The operating system 752 may include instructions for handling basic system services and for performing hardware dependent tasks. In some implementations, the operating system 752 can be a kernel.

The memory 750 can also store communication instructions 754 to facilitate communicating with one or more additional devices, one or more computers and/or one or more servers, for example, to retrieve web resources from remote web servers. The memory 750 can also include user interface instructions 756, including graphical user interface instructions to facilitate graphic user interface processing.

Additionally, the memory 750 can store sensor processing instructions 758 to facilitate sensor-related processing and functions; telephony instructions 760 to facilitate telephone-related processes and functions; messaging instructions 762 to facilitate electronic-messaging related processes and functions; web browser instructions 764 to facilitate web browsing-related processes and functions; media processing instructions 766 to facilitate media processing-related processes and functions; location services instructions including GPS and/or navigation instructions 768 and Wi-Fi based location instructions to facilitate location based functionality; camera instructions 770 to facilitate camera-related processes and functions; and/or other software instructions 772 to facilitate other processes and functions, e.g., security processes and functions, and processes and functions related to the systems. The memory 750 may also store other software instructions such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. A mobile equipment identifier, such as an International Mobile Equipment Identity (IMEI) 774 or a similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions may be implemented in hardware and/or in software, including in one or more signal processing and/or application specific integrated circuits.

Figure 8:
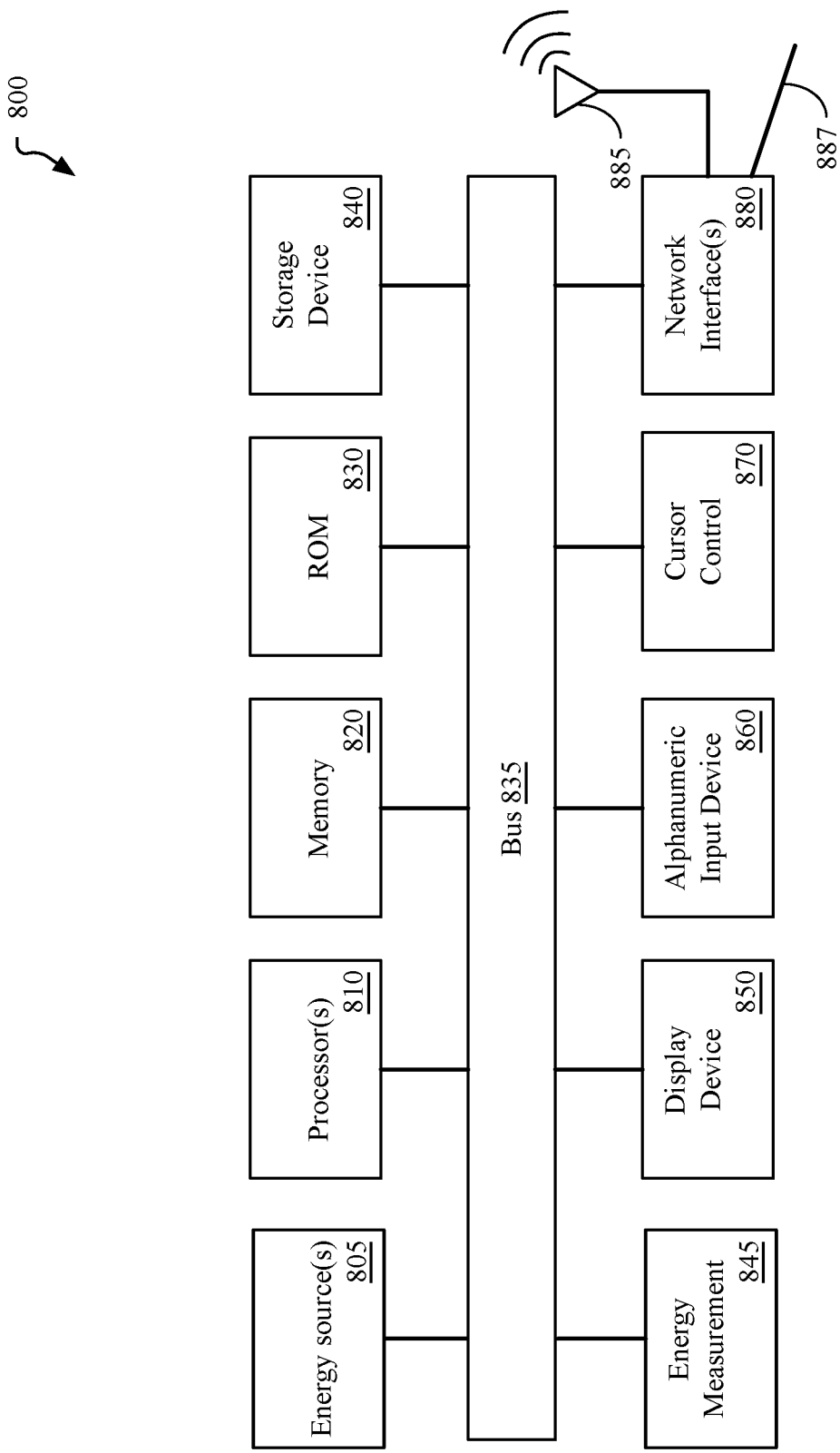
FIG. 8 is a block diagram of a computing system, according to an embodiment.

FIG. 8 is a block diagram of a computing system 800, according to an embodiment. The illustrated computing system 800 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 800 can be used to provide the computing device and/or a server device to which the computing device may connect.

The computing system 800 includes bus 835 or other communication device to communicate information, and processor(s) 810 coupled to bus 835 that may process information. While the computing system 800 is illustrated with a single processor, the computing system 800 may include multiple processors and/or co-processors. The computing system 800 further may include memory 820 in the form of random access memory (RAM) or other dynamic storage device coupled to the bus 835. The memory 820 may store information and instructions that may be executed by processor(s) 810. The memory 820 may also be main memory that is used to store temporary variables or other intermediate information during execution of instructions by the processor(s) 810.

The computing system 800 may also include read only memory (ROM) 830 and/or another data storage device 840 coupled to the bus 835 that may store information and instructions for the processor(s) 810. The data storage device 840 can be or include a variety of storage devices, such as a flash memory device, a magnetic disk, or an optical disc and may be coupled to computing system 800 via the bus 835 or via a remote peripheral interface.

The computing system 800 may also be coupled, via the bus 835, to a display device 850 to display information to a user. The computing system 800 can also include an alphanumeric input device 860, including alphanumeric and other keys, which may be coupled to bus 835 to communicate information and command selections to processor(s) 810. Another type of user input device includes a cursor control 870 device, such as a touchpad, a mouse, a trackball, or cursor direction keys to communicate direction information and command selections to processor(s) 810 and to control cursor movement on the display device 850. The computing system 800 may also receive user input from a remote device that is communicatively coupled via one or more network interface(s) 880.

The computing system 800 further may include one or more network interface(s) 880 to provide access to a network, such as a local area network. The network interface(s) 880 may include, for example, a wireless network interface having antenna 885, which may represent one or more antenna(e). The computing system 800 can include multiple wireless network interfaces such as a combination of Wi-Fi, Bluetooth®, near field communication (NFC), and/or cellular telephony interfaces. The network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, the network interface(s) 880 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 800 can further include one or more energy sources 805 and one or more energy measurement systems 845. Energy sources 805 can include an AC/DC adapter coupled to an external power source, one or more batteries, one or more charge storage devices, a USB charger, or other energy source. Energy measurement systems include at least one voltage or amperage measuring device that can measure energy consumed by the computing system 800 during a predetermined period of time. Additionally, one or more energy measurement systems can be included that measure, e.g., energy consumed by a display device, cooling subsystem, Wi-Fi subsystem, or other frequently used or high-energy consumption subsystem.

In utilizing the various aspects of the embodiments, it would become apparent to one skilled in the art that combinations or variations of the above embodiments are possible for forming a fan out system in package including multiple redistribution layers. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method for compression of data, the method comprising:
   accessing a first plane of sensor data;
   dividing the first plane of sensor data into a plurality of slices;
   encoding each sample in each slice from the plurality of slices, wherein encoding a sample comprises:
      computing a median based prediction for the sample;
      computing an error for the sample comprising a difference between the sample and the computed median based prediction;
      determining a context for the sample;
      selecting a model for the sample by using the determined context; and
      encoding the computed error by using the selected model.

2. The method of claim 1, wherein the context is a three-dimensional context.

3. The method of claim 1, wherein for at least one sample, determining the context comprises determining the context by using at least one previously processed sample.

4. The method of claim 1, wherein the first plane of sensor data is data for a single component of a frame of sensor data, wherein the frame of sensor data includes data for a plurality of components, the method further comprising:
   accessing the frame of sensor data;
   separating the accessed frame of sensor data into a plurality of planes including the first plane; and
   assigning each slice of the first plane to a processing core of a plurality of processing cores, wherein for each slice, the processing core assigned to the slice encodes samples of the plane.

5. The method of claim 1, wherein the sensor data is at least one of lidar data, thermal data, image data, and infrared data.

6. The method of claim 1, wherein dividing the first plane of sensor data into a plurality of slices comprises slicing the sensor data at least one of horizontally or vertically.

7. The method of claim 1, further comprising: applying run length encoding.

8. The method of claim 1, further comprising: gathering statistics for each accessed plane of sensor data to precompute a plurality of models; and storing parameters for the plurality of models.

9. The method of claim 8, further comprising: decoding the encoded sensor data using the plurality of models.

10. The method of claim 1, wherein the first plane is processed from left to right, and wherein for at least one sample, determining the context comprises determining the context by using previously processed sample data that is positioned relative to the sample in at least one of in a row processed prior to the sample or to the left of the sample.

11. A system comprising:
    one or more processors;
    memory storing instructions that when executed by the one or more processors, causes the one or more processors to perform operations comprising:
       accessing a first plane of sensor data;
       dividing the first plane of sensor data into a plurality of slices;
       encoding each sample in each slice from the plurality of slices, wherein encoding a sample comprises:
          computing a median based prediction for the sample;
          computing an error for the sample comprising a difference between the sample and the computed median based prediction;
          determining a context for the sample;
          selecting a model for the sample by using the determined context; and
          encoding the computed error by using the selected model.

12. The system of claim 11, wherein the context is a three-dimensional context.

13. The system of claim 11, wherein for at least one sample, determining the context comprises determining the context by using at least one previously processed sample.

14. The system of claim 11, wherein the first plane of sensor data is data for a single component of a frame of sensor data, wherein the frame of sensor data includes data for a plurality of components, the operations further comprising:
    accessing the frame of sensor data;
    separating the accessed frame of sensor data into a plurality of planes including the first plane; and
    assigning each slice of the first plane to a processing core of a plurality of processing cores, wherein for each slice, the processing core assigned to the slice encodes samples of the plane.

15. The system of claim 11, wherein the sensor data is at least one of lidar data, thermal data, image data, and infrared data.

16. The system of claim 11, wherein dividing the first plane of sensor data into a plurality of slices comprises slicing the sensor data at least one of horizontally or vertically.

17. The system of claim 11, the operations further comprising: applying run length encoding.

18. The system of claim 11, the operations further comprising: gathering statistics for each accessed plane of sensor data to precompute a plurality of models; and storing parameters for the plurality of models.

19. The system of claim 11, the operations further comprising: decoding the encoded sensor data using the plurality of models.

20. A non-transitory machine-readable medium having instructions stored thereon, wherein the instructions cause one or more processors of an electronic device to perform operations comprising:
    accessing a first plane of sensor data;
    dividing the first plane of sensor data into a plurality of slices;
    encoding each sample in each slice from the plurality of slices, wherein encoding a sample comprises:
       computing a median based prediction for the sample;
       computing an error for the sample comprising a difference between the sample and the computed median based prediction;
       determining a context for the sample;
       selecting a model for the sample by using the determined context; and encoding the computed error by using the selected model.

\* \* \* \* \*